(12) United States Patent
Lockyer et al.

(10) Patent No.: US 7,975,487 B2
(45) Date of Patent: Jul. 12, 2011

(54) COMBUSTOR ASSEMBLY FOR GAS TURBINE ENGINE

(75) Inventors: John F. Lockyer, San Diego, CA (US);
Stuart A. Greenwood, San Diego, CA (US); Partha X. Dutta, San Diego, CA (US); Ted E. Groocock, Chula Vista, CA (US); Michael D. Fox, San Diego, CA (US)

(73) Assignee: Solar Turbines Inc., San Diego, CA (US)

( * ) Notice: Subject to any disclaimer, the term of this patent is extended or adjusted under 35 U.S.C. 154(b) by 876 days.

(21) Appl. No.: 11/901,980

(22) Filed: Sep. 20, 2007

(65) Prior Publication Data

US 2008/0092547 A1    Apr. 24, 2008

Related U.S. Application Data

(60) Provisional application No. 60/846,085, filed on Sep. 21, 2006.

(51) Int. Cl.
*F02C 1/00* (2006.01)
(52) U.S. Cl. .............................. 60/752; 60/740
(58) Field of Classification Search ............... 60/740, 60/752–760
See application file for complete search history.

(56) References Cited

U.S. PATENT DOCUMENTS

| | | | |
|---|---|---|---|
| 2,510,645 A * | 6/1950 | McMahan | 60/796 |
| 2,657,531 A * | 11/1953 | Pierce | 60/755 |
| 3,369,363 A | 2/1968 | Campbell | |
| 3,990,232 A | 11/1976 | Campbell | |
| 4,109,459 A | 8/1978 | Ekstedt et al. | |
| 5,058,375 A | 10/1991 | Shekelton et al. | |
| 5,253,471 A * | 10/1993 | Richardson | 60/804 |
| 5,291,732 A | 3/1994 | Halila | |
| 5,329,773 A | 7/1994 | Myers et al. | |
| 5,402,635 A | 4/1995 | Smith et al. | |

(Continued)

FOREIGN PATENT DOCUMENTS

EP    0 178 820    4/1986

(Continued)

OTHER PUBLICATIONS

English-language Abstract for JP 4-227418.

*Primary Examiner* — Michael Cuff
*Assistant Examiner* — Phutthiwat Wongwian
(74) *Attorney, Agent, or Firm* — Finnegan, Henderson, Farabow, Garrett & Dunner LLP

(57) ABSTRACT

A combustor liner assembly includes a liner assembly, including a hot dome, a hot wall, and an impingement shield. The liner assembly further includes a convector assembly. The combustor liner assembly further includes an impingement dome assembly, including a ring-shaped portion defining a plurality of apertures configured to receive a plurality of fuel injectors, and a face. The ring-shaped portion and the face define an annular passage, and the face defines a plurality of apertures and a plurality of orifices. The convector assembly and the impingement dome assembly are operably coupled to one another, and the plurality of orifices of the face are configured such that the hot dome is exposed to air flowing in the annular passage of the impingement dome assembly. The combustor liner assembly is configured to provide flow communication between the annular passage of the impingement dome assembly and the plurality of fuel injectors.

19 Claims, 14 Drawing Sheets

U.S. PATENT DOCUMENTS

| | | | |
|---|---|---|---|
| 5,540,056 A * | 7/1996 | Heberling et al. | 60/737 |
| 5,765,376 A * | 6/1998 | Zarzalis et al. | 60/748 |
| 5,802,841 A | 9/1998 | Maeda | |
| 6,684,620 B2 | 2/2004 | Tiemann | |
| 6,725,666 B2 | 4/2004 | Tiemann | |
| 6,826,913 B2 * | 12/2004 | Wright | 60/772 |

FOREIGN PATENT DOCUMENTS

| | | |
|---|---|---|
| EP | 0 691 512 A2 | 1/1996 |
| EP | 0 724 119 | 7/1996 |
| EP | 1 429 078 | 6/2004 |
| EP | 1 434 007 | 6/2004 |
| JP | 4-227418 | 8/1992 |

* cited by examiner

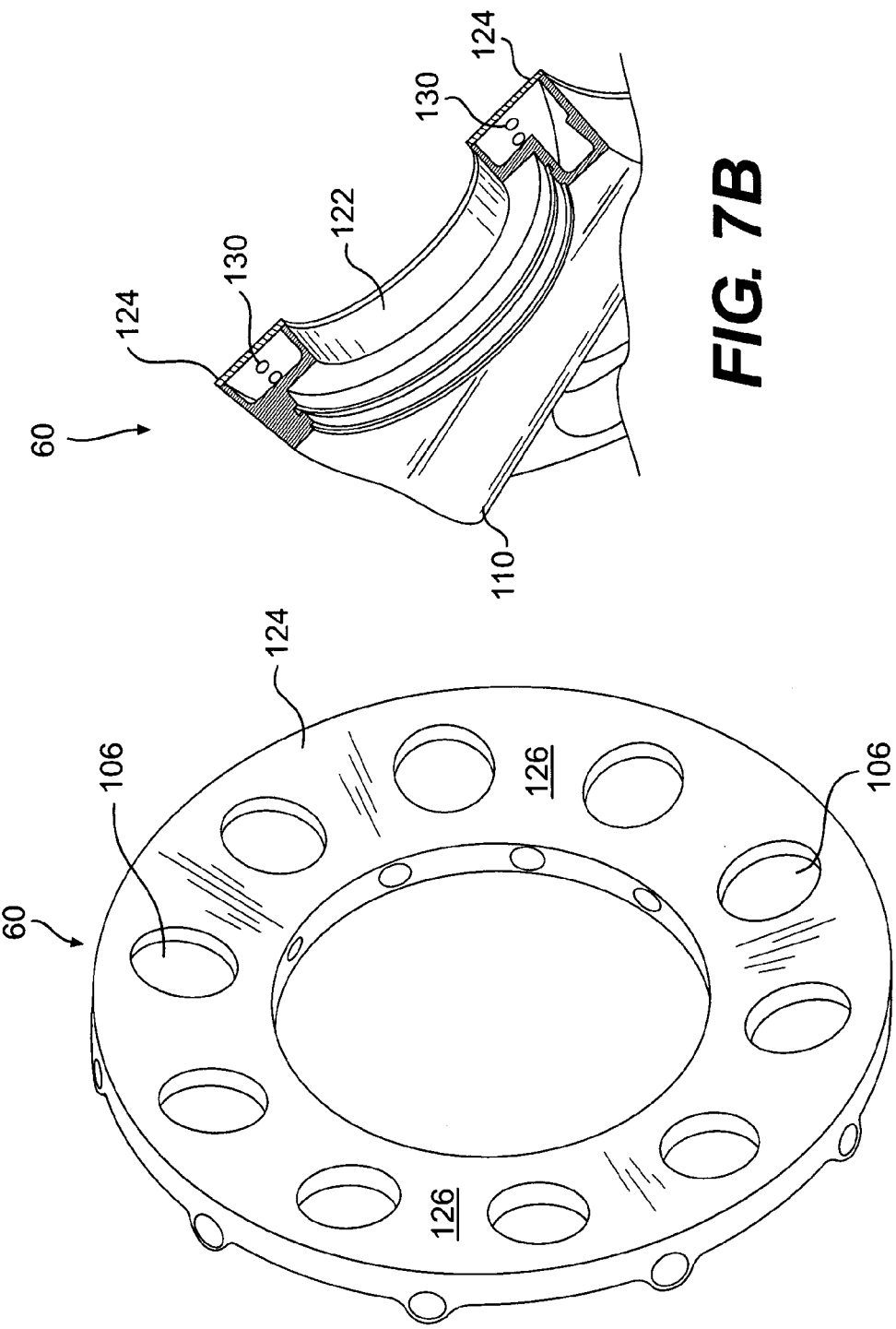

COMBUSTOR ASSEMBLY FOR GAS TURBINE ENGINE

This application claims the benefit of priority under 35 U.S.C. §119(e) of U.S. Provisional Application No. 60/846,085, filed Sep. 21, 2006, the disclosure of which is incorporated herein by reference.

TECHNICAL FIELD

The present disclosure relates generally to a combustor assembly for a gas turbine engine (GTE) and, more particularly, systems and methods for managing air flow in a GTE combustor assembly.

BACKGROUND

GTEs convert the potential energy associated with air and fuel into energy primarily in the form of mechanical rotation and heat. A conventional GTE may include a compressor assembly, a combustor assembly, and a turbine assembly. During operation, air is drawn into the compressor assembly where it is compressed and supplied to the combustor assembly. The combustor assembly supplies fuel to the compressed air and ignites compressed air and fuel. Once ignited, the compressed air and fuel undergoes combustion, which increases the velocity of the combustion products. The combustion products are supplied to the turbine assembly, where expansion of the combustion products through the turbine assembly causes a turbine to rotate. The turbine may be coupled to the compressor assembly and one or more systems that use the rotational energy and/or thermal energy developed by the turbine. For example, a GTE may be used to supply energy to power machines, such as airplanes, locomotives, boats, ships, trucks, automobiles, electric generators, pumps, or other machines configured to perform work.

The combustion of fuel by conventional GTEs results in a desire to increase the efficiency of combustion and reduce the undesirable emissions resulting from combustion of the fuel. Moreover, high temperatures generated in the combustor assembly can lead to high maintenance if such high temperatures are not controlled. In particular, temperature gradients may exist in the combustor assembly that result different parts of the combustor assembly expanding by different amounts. If such thermal expansion is not accounted for in the combustor assembly design, it might lead to a reduced useful life of the combustor assembly and/or the GTE. The control of high temperatures according to some conventional methods, however, may result in the reduced efficiency and/or increased emission of undesirable by-products of combustion, such as, for example, greenhouse gases.

A combustor having a liner support assembly is disclosed in U.S. Pat. No. 5,291,732 ("the '732 patent") issued to Halila. The '732 patent discloses a support assembly for a gas turbine engine combustor, including an annular frame having a plurality of circumferentially spaced apart tenons. An annular combustor liner is disposed coaxially with the frame and includes a plurality of circumferentially spaced apart tenons circumferentially adjoining respective ones of the frame tenons for radially and tangentially supporting the liner to the frame, while allowing unrestrained differential thermal radial movement between the liner and frame.

Although the liner support assembly disclosed in the '732 patent may assist in supporting the combustor liner in the combustor, the liner support assembly may permit movement of, for example, the outer liner relative to the outer frame and the dome assembly. Such movement may render it problematic to accurately and consistently position the internal components of the combustor, which result in unintended gaps between the outer liner and the outer frame. Such gaps may result in reduced efficiency of the combustion process and/or combustor cooling, and/or an increase in undesirable emissions.

The systems and methods described in an exemplary manner in the present disclosure may be directed to mitigating or overcoming one or more of the potential drawbacks set forth above.

SUMMARY

In one aspect, the present disclosure includes a combustor liner assembly for a gas turbine engine. The combustor liner assembly includes a liner assembly, including a hot dome defining a plurality of apertures configured to receive a plurality of fuel injectors, a hot wall defining a reaction zone configured for housing combustion of fuel and air, and an impingement shield. The hot wall and the impingement shield define a cooling chamber. The liner assembly further includes a convector assembly defining a plurality of apertures configured to receive a plurality of fuel injectors. The combustor liner assembly further includes an impingement dome assembly, including a ring-shaped portion defining a plurality of apertures configured to receive a plurality of fuel injectors, and a face. The ring-shaped portion and the face define an annular passage, and the face defines a plurality of apertures and a plurality of orifices. The convector assembly and the impingement dome assembly are operably coupled to one another, and the plurality of orifices of the face of the impingement dome assembly are configured such that the hot dome is exposed to air flowing in the annular passage of the impingement dome assembly. The combustor liner assembly is configured to provide flow communication between the annular passage of the impingement dome assembly and the plurality of fuel injectors.

According to another aspect, the disclosure includes a combustor for a gas turbine engine. The combustor includes a combustor housing, including an outer housing and an inner housing, wherein the outer and inner housings define a chamber. The combustor further includes a plurality of fuel injectors operably coupled to the outer housing and extending within the chamber, and a combustor liner assembly. The combustor liner assembly includes a convector assembly, a liner assembly defining a hot dome, and an impingement dome assembly defining an annular passage. The combustor further includes support pins configured to operably couple the combustor liner assembly to the combustor housing, wherein the support pins are configured to supply air to the annular passage of the impingement dome assembly. The annular passage is configured to supply air to the hot dome, and the air supplied to the hot dome via the annular passage is in flow communication with the fuel injectors.

According to a further aspect, the disclosure includes a method of operating a combustor assembly of a gas turbine engine. The method includes flowing compressed air received from a compressor into a combustor housing, flowing a first portion of the compressed air into an impingement dome assembly. The method further includes flowing the first portion of the compressed air from the impingement dome assembly onto a hot dome and flowing the first portion of the compressed air from the hot dome to a plurality of fuel injectors configured to inject fuel for combustion. The method further includes flowing a second portion of the compressed air from the combustor housing to the fuel injectors for combustion, and flowing a third portion of the compressed air from the combustor housing to a liner assembly of the combustor.

BRIEF DESCRIPTION OF THE DRAWINGS

FIG. 7A is a schematic perspective view of the exemplary embodiment shown in FIG. 6B with the removed portion in place;

FIG. 7B is a partial, schematic section view of an exemplary embodiment of an impingement dome;

DETAILED DESCRIPTION

Figure 1:
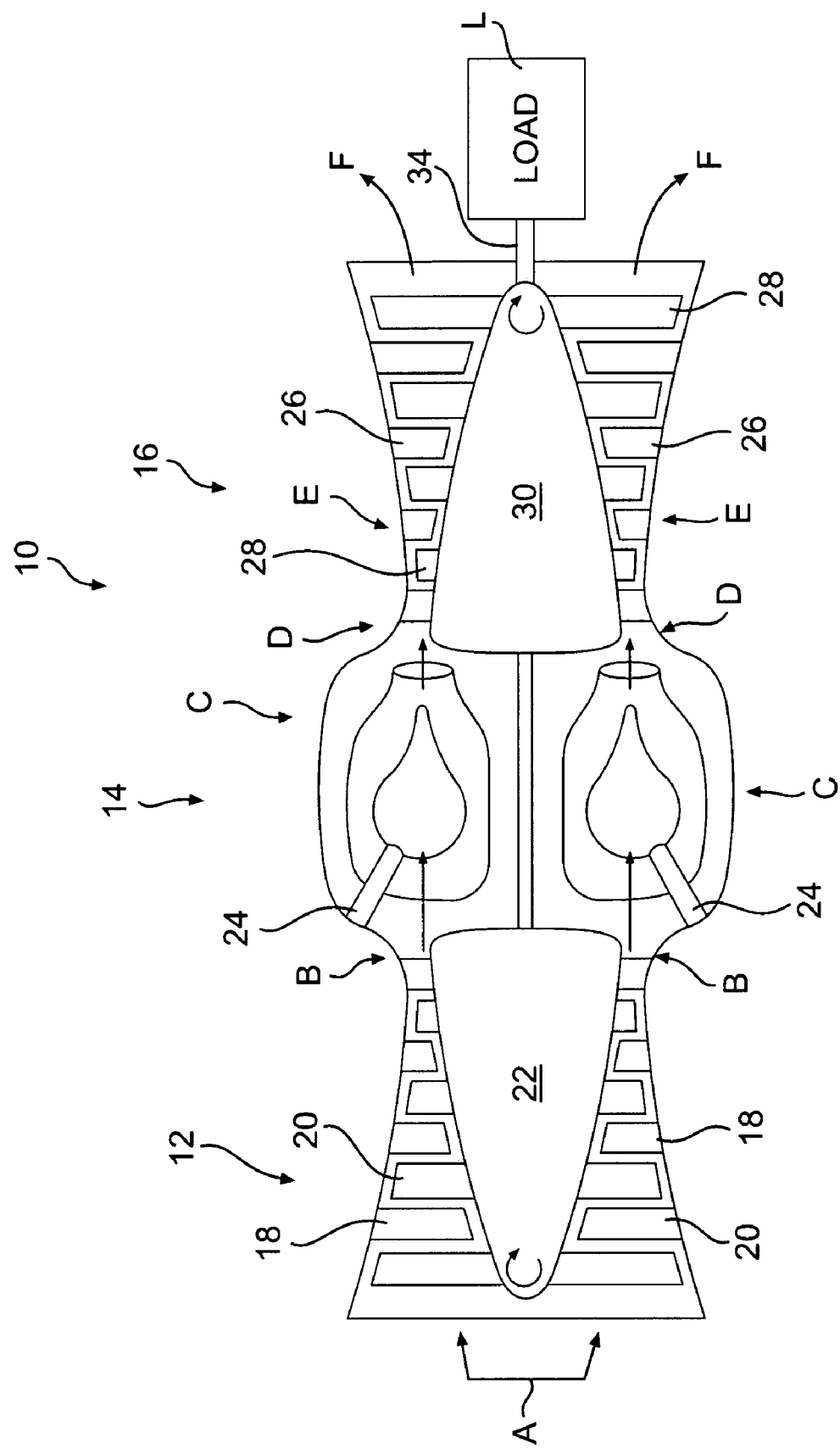
FIG. 1 is a schematic section view of an exemplary embodiment of a GTE.

FIG. 1 illustrates an exemplary embodiment of a GTE 10, which may be used, for example, to supply power to machines, such as vehicles, power generators, and pumps. Exemplary GTE may include a compressor section 12, a combustor section 14, and a turbine section 16. Compressor section 12 is configured to draw air into GTE at A and compress the air before it enters combustor section 14 at B. Compressor section 12 includes stationary blades 18 and rotating blades 20 operably coupled to a compressor hub 22. Stationary blades 18 and rotating blades 20 are shaped such that as rotating blades 20 rotate, the air is drawn through compressor section 12, so that it is compressed and acquires a higher pressure by the time the air reaches B, thereby increasing its potential energy.

The compressed air from compressor section 12 enters combustor section 14, and fuel is supplied to combustor section 14 via one or more fuel injector(s) 24. The fuel and air are ignited at C, thereby causing the air to expand and enter turbine section 16 upon exit of combustor section 14 at D. Turbine section 16 includes stationary blades 26 and rotating blades 28 operably coupled to a turbine hub 30. Stationary blades 26 and rotating blades 28 are configured to cause rotating blades 28 to rotate as the expanding air passes through turbine section 16 at E and exits turbine section 16 at F.

Compressor hub 22 and turbine hub 30 may be operably coupled to one another via a shaft 32. As turbine hub 30 is driven by rotating blades 28 of turbine section 16 upon expansion of air through stationary blades 26 and rotating blades 28, shaft 32 transfers the rotating power to compressor hub 22. As compressor hub 22 is driven to rotate rotating blades 20 of compressor section 12, air is drawn into compressor section 12 at A and compressed as it passes through compressor section 12 and exits as at B.

According to some embodiments, turbine hub 30 may be operably coupled to a load L for performing work in addition to being operably coupled to compressor hub 22. For example, turbine hub 30 may be coupled to a drive shaft 34 and/or a reduction transmission (not shown), which, in turn, may be coupled to load L, which may be used, for example, to supply energy to power machines, such as airplanes, locomotives, boats, ships, trucks, automobiles, electric generators, pumps, and/or other machines configured to perform work.

Figure 2:
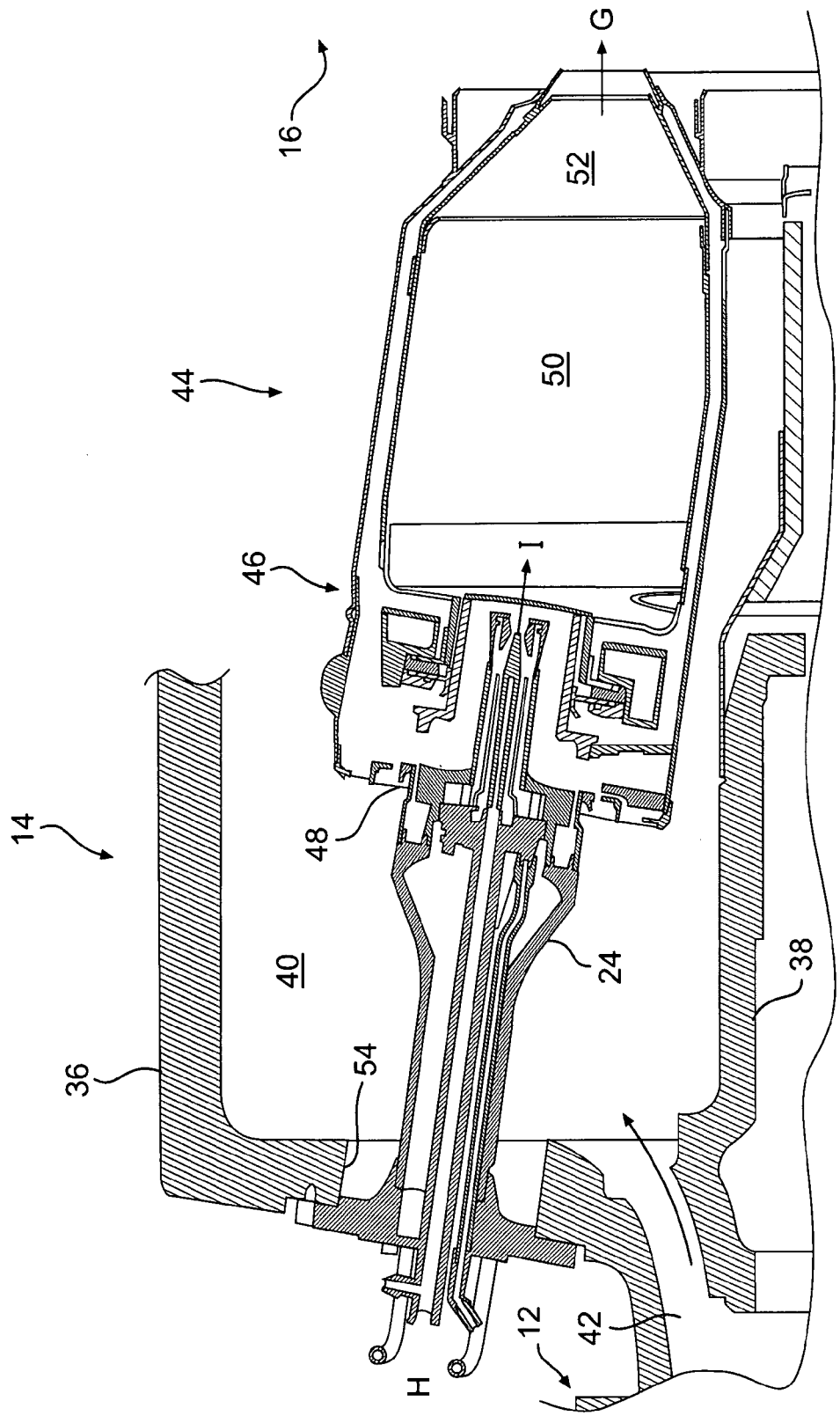
FIG. 2 is a schematic section view of a portion of an exemplary embodiment of a combustor assembly.

Referring to FIG. 2, an exemplary combustor section 14 may include an outer housing 36 and an inner housing 38 that define an annular chamber 40 and an inlet passage 42. Inlet passage 42 provides flow communication between compressor section 12 and annular chamber 40. Housed within annular chamber 40 is an exemplary combustor assembly 44. According to some embodiments, combustor assembly 44 may be an annular combustor assembly. For example, combustor assembly 44 may include a combustor liner assembly 46 (e.g., an annular liner assembly) defining at one end, one or more (e.g., ten) aperture(s) 48 configured to receive fuel injector(s) 24. Combustor liner assembly 46 may define a reaction zone 50 configured to accommodate combustion of air and an exit cone 52 configured to provide flow communication between reaction zone 50 and turbine section 16, as shown at G. According to some embodiments, air and fuel enters reaction zone 50 and is ignited and combusts. The products of combustion exit combustor liner assembly 46 via exit cone 52.

According to some embodiments, outer housing 36 may define one or more, for example, ten, aperture(s) 54 configured to receive fuel injector(s) 24 configured to supply fuel to combustor liner assembly 46. For example, fuel may enter fuel injector at H and exit into reaction zone at I, where it may be combusted. According to some embodiments, annular chamber 40 may be configured such that air entering annular chamber 40 via inlet passage 42 may only exit combustor section 14 by passing through combustor assembly 44. For example, combustor liner assembly 46 may be configured to provide flow communication between inlet passage 42 and exit cone 52 sufficient for all of the air entering at inlet passage 42 (except for compressed air used for cooling turbine section 16) to pass through combustor liner assembly 46, as will be explained in more detail herein.

Figure 3:
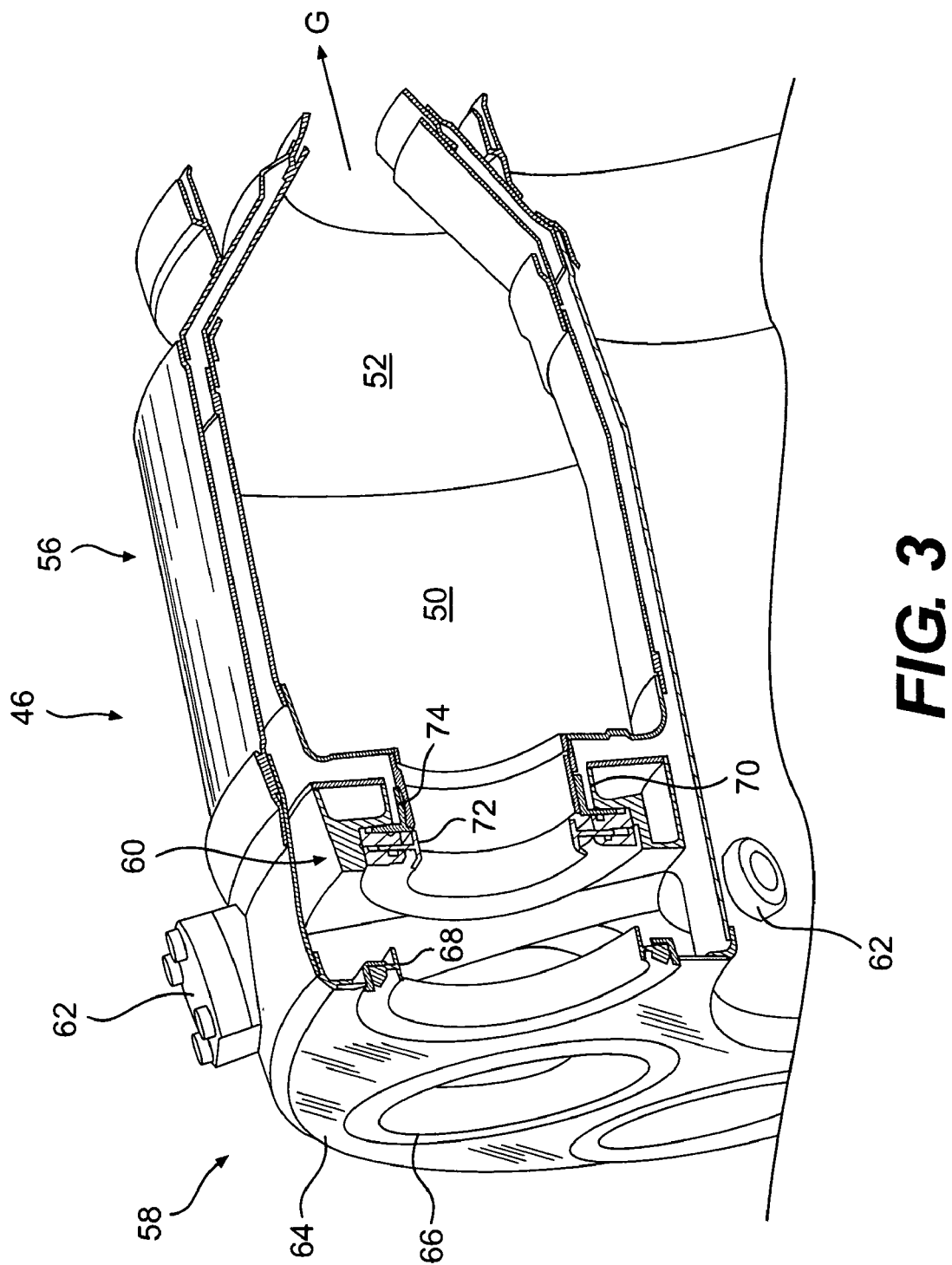
FIG. 3 is a schematic, perspective section view of a portion of an exemplary embodiment of a combustor liner assembly.

FIG. 3 is a schematic illustration of an exemplary embodiment of combustor liner assembly 46. Exemplary combustor liner assembly 46 includes a liner assembly 56, a convector assembly 58, and an impingement dome assembly 60. According some embodiments, liner assembly 46 defines an annular assembly configured to be housed in an annular combustor assembly. Convector assembly 58 and liner assembly 56 may be operably coupled to one another via, for example, welding and/or brazing. According to some embodiments, impingement dome assembly 60 may be operably coupled to convector assembly 58 and/or liner assembly 56 via one of more support pin(s) 62.

According to some embodiments, convector assembly 58 may include a ring-shaped portion 64 defining one or more (e.g., ten) aperture(s) 66 configured to receive a convector assembly grommet 68, which, in turn, may be configured to receive fuel injector 24 (see FIG. 2). Convector assembly grommets 68 may be configured to seal the interface between fuel injectors 24 and apertures 66 and/or to permit relative movement between fuel injectors 24 and convector assembly 58.

According to some embodiments, impingement dome assembly 60 may define one or more (e.g., ten) aperture(s) 70 configured to receive an injector grommet 72 and/or a liner grommet 74, which, in turn, may be configured to respectively receive fuel injector 24 and/or liner assembly 56. Injector grommet 72 may be configured to seal the interface between fuel injector 24 and impingement dome assembly 60 and/or to permit relative movement between fuel injector 24 and impingement dome assembly 60, and liner grommet 74 may be configured to seal the interface between liner assembly 56 and impingement dome assembly 60 and/or to permit relative movement between liner assembly 56 and impingement dome assembly 60.

Figure 4:
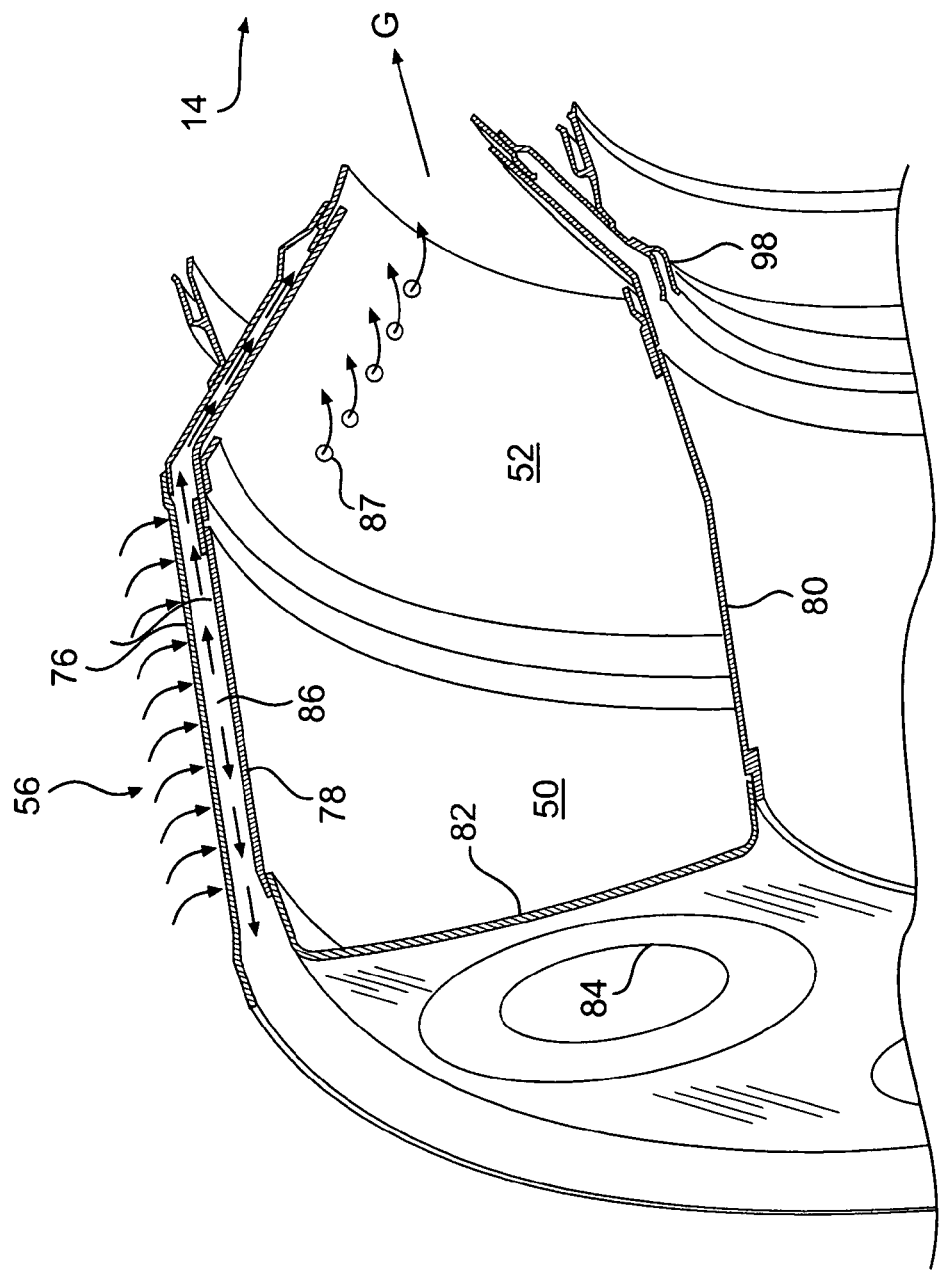
FIG. 4 is a schematic, perspective section view of a portion of an exemplary embodiment of a combustor liner assembly.

Referring to FIG. 4, which schematically illustrates an exemplary embodiment of a liner assembly 56, exemplary liner assembly 56 includes an outer impingement shield 76 and an outer hot wall 78 and an inner hot wall 80 joined by a hot dome 82. Hot dome 82 defines one or more (e.g., ten) aperture(s) 84 configured to receive fuel injector(s) 24. Outer hot wall 78 and inner hot wall 80 define reaction zone 50 and exit cone 52. According to some embodiments, outer impingement shield 76 defines a plurality of orifices (not shown), which permit compressed air in annular chamber 40 of combustor section 14 to enter a space 86 between outer impingement shield 76 and outer hot wall 78, which splashes on the outer surface of outer hot wall 78, thereby cooling outer hot wall 78 adjacent reaction zone 50. Air entering space 86 may then flow toward hot dome 82 and/or toward exit cone 52. According to some embodiments, the portion of inner hot wall 80 and/or outer hot wall 78 defining exit cone 52 may include a plurality of orifices 87, which provide flow communication between space 86 and the exit of combustor section 14 at G. Thus, air entering space 86 via orifices in outer impingement shield 76 is not directed into reaction zone 50.

Figure 5B:
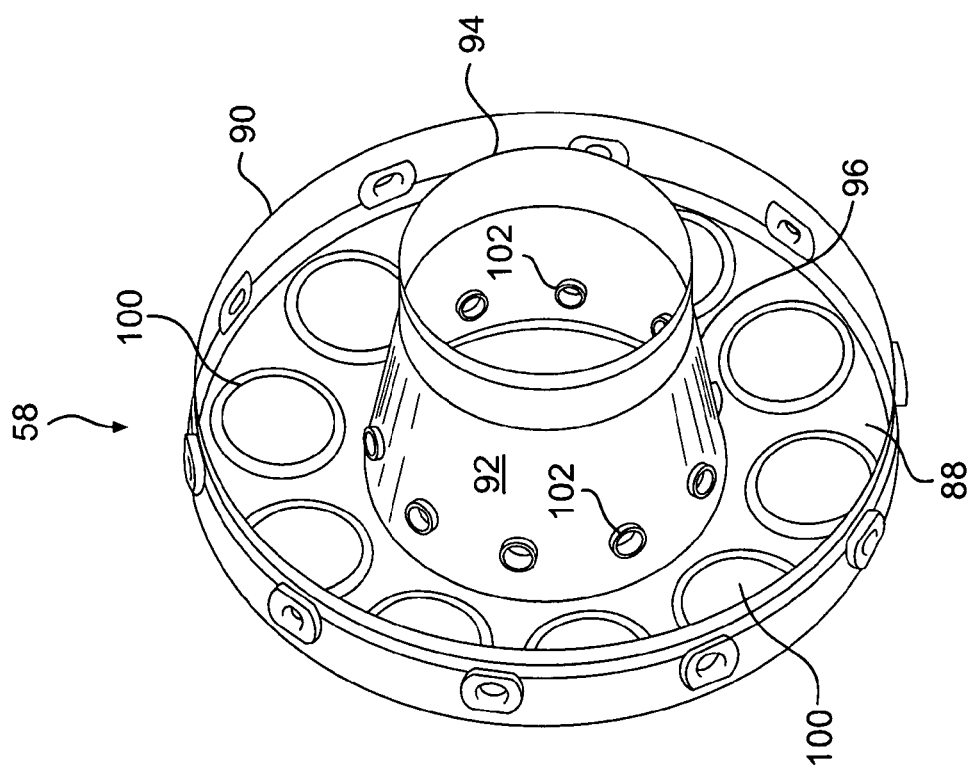
FIG. 5B is a schematic, perspective view of the exemplary embodiment shown in FIG. 5A from another perspective.
Figure 5A:
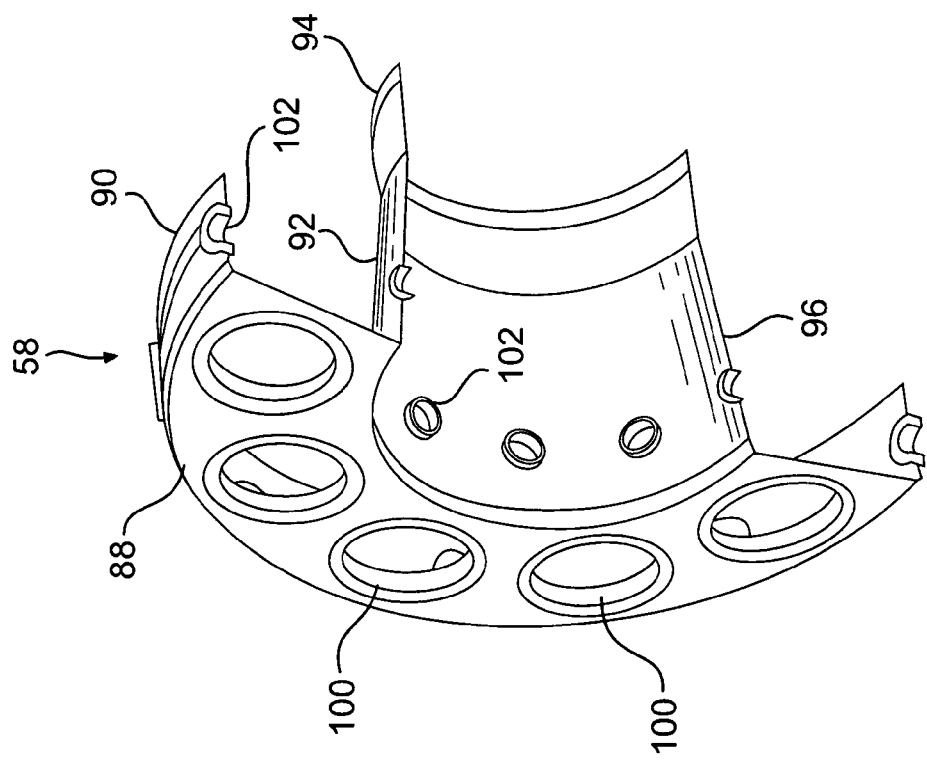
FIG. 5A is a schematic, perspective section view of an exemplary embodiment of a convector assembly.

Referring to FIGS. 5A and 5B, which schematically illustrate two views of an exemplary embodiment of convector assembly 58, exemplary convector assembly 58 defines ring-shaped portion 88, which joins an outer flange 90 to an inner flange 92 that defines a tubular portion 94, defining an inner impingement shield 96. According to some embodiments, outer flange 90 is configured to be operably coupled to liner assembly 56's outer impingement shield 76 (see FIG. 4) via, for example, welding and or brazing. Inner impingement shield 96 is configured to be operably coupled to an inner portion 98 of exit cone 52 (see FIG. 4) via, for example, welding and/or brazing. According to some embodiments, inner impingement shield 96, similar to outer impingement shield 76 (see FIG. 4), defines a plurality of orifices (not shown) configured to permit flow communication between compressed air in annular chamber 40 of combustor section 14 and inner hot wall 80, thereby cooling inner hot wall 80.

Ring-shaped portion 88 of convector assembly 58 defines one or more (e.g., ten) aperture(s) 100 configured to receive liner grommet(s) 74 and fuel injector(s) 24, as described previously herein. Outer flange 90 and inner flange 92 of convector assembly 58 define a plurality of apertures 102 (e.g., ten apertures in each of outer flange 90 and inner flange 92), which are configured to receive support pins 62. According to some embodiments, one or more of support pins 62 is/are configured to operably couple combustor assembly 44 and annular chamber 40 to one another.

Figure 6B:
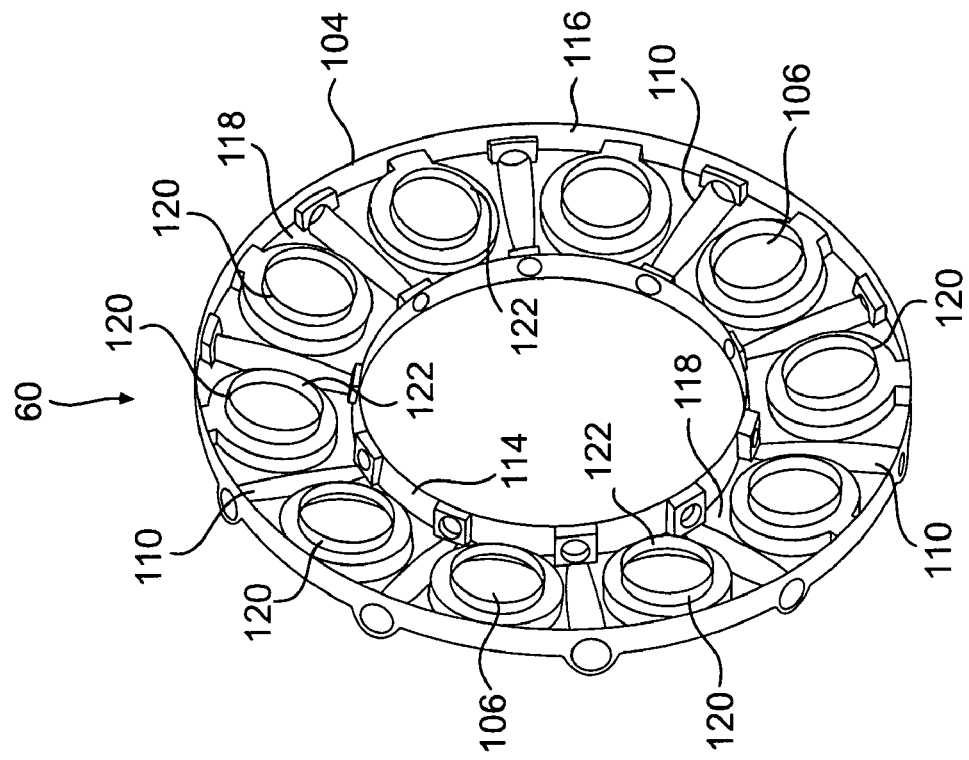
FIG. 6B is a schematic perspective view of the exemplary embodiment shown in FIG. 6A from another perspective with a portion removed.
Figure 6A:
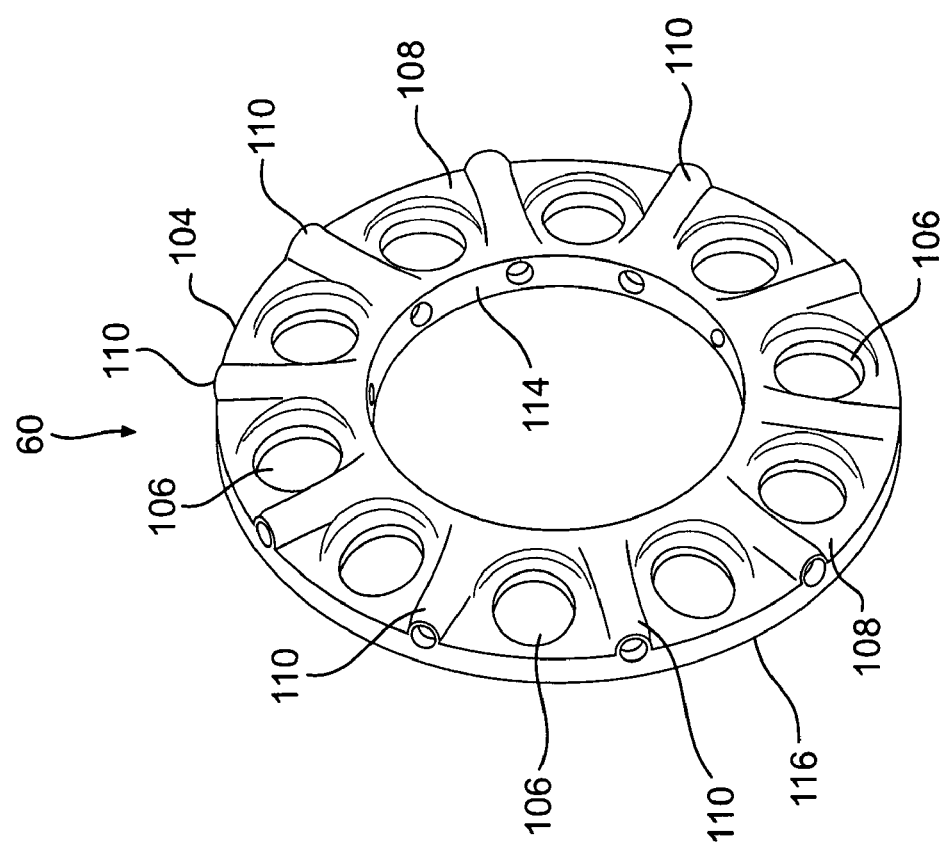
FIG. 6A is schematic perspective view of an exemplary embodiment of an impingement dome.

FIGS. 6A and 6B schematically illustrate two views of an exemplary embodiment of impingement dome assembly 60. Referring to FIG. 6A, exemplary impingement dome assembly 60 includes a ring-shaped portion 104 configured to be positioned between liner assembly 56 and convector assembly 58 (see FIG. 3). Ring-shaped portion 104 defines one or more (e.g., ten) aperture(s) 106 configured to receive injector grommet(s) 72 and/or liner grommet(s) 74 and fuel injector(s) 24. Ring-shaped portion 104 may also include a front face 108 (visible in FIG. 6a) and one or more (e.g., ten) substantially cylindrical-shaped housing(s) 110 configured to receive one or more support pin(s) 62. According to some embodiments, housings 110 may extend from an outer diameter to an inner diameter of ring-shaped portion 104. Referring to FIG. 6B, a back face 112 of ring-shaped portion 104 may define an inner flange 114 and an outer flange 116 defining an annular recess 118. Within annular recess 118, one or more (e.g., ten) tubular portion(s) 120 may extend from the back side of apertures 106. For example, tubular portions 120 may define an inner diameter defining guide surfaces 122. According to some embodiments, housings 110 may be open in a direction extending away from a back side of annular recess 118, for example, such that support pins 62 are exposed when viewing ring-shaped portion 104 from the perspective shown in FIG. 6B.

FIGS. 7A and 7B schematically illustrate two views of an exemplary embodiment of impingement dome assembly 60. In particular, FIG. 7A shows a view of exemplary impingement dome assembly 60 similar to the view shown in FIG. 6B, except that impingement dome assembly 60 includes a plate 124 defining a face 126 configured to cover the back side of impingement dome assembly 60, such that housings 110 and tubular portions 120 are covered. Referring to FIG. 7B, plate 124 and ring-shaped portion 104 may be configured such that plate 124 and ring-shaped portion 104 define an annular passage 128 providing flow communication between housings 110 and annular passage 128. Plate 124 may define a plurality of orifices 130, which are configured to provide flow communication between housings 110, annular passage 128, and orifices 130.

Figure 8:
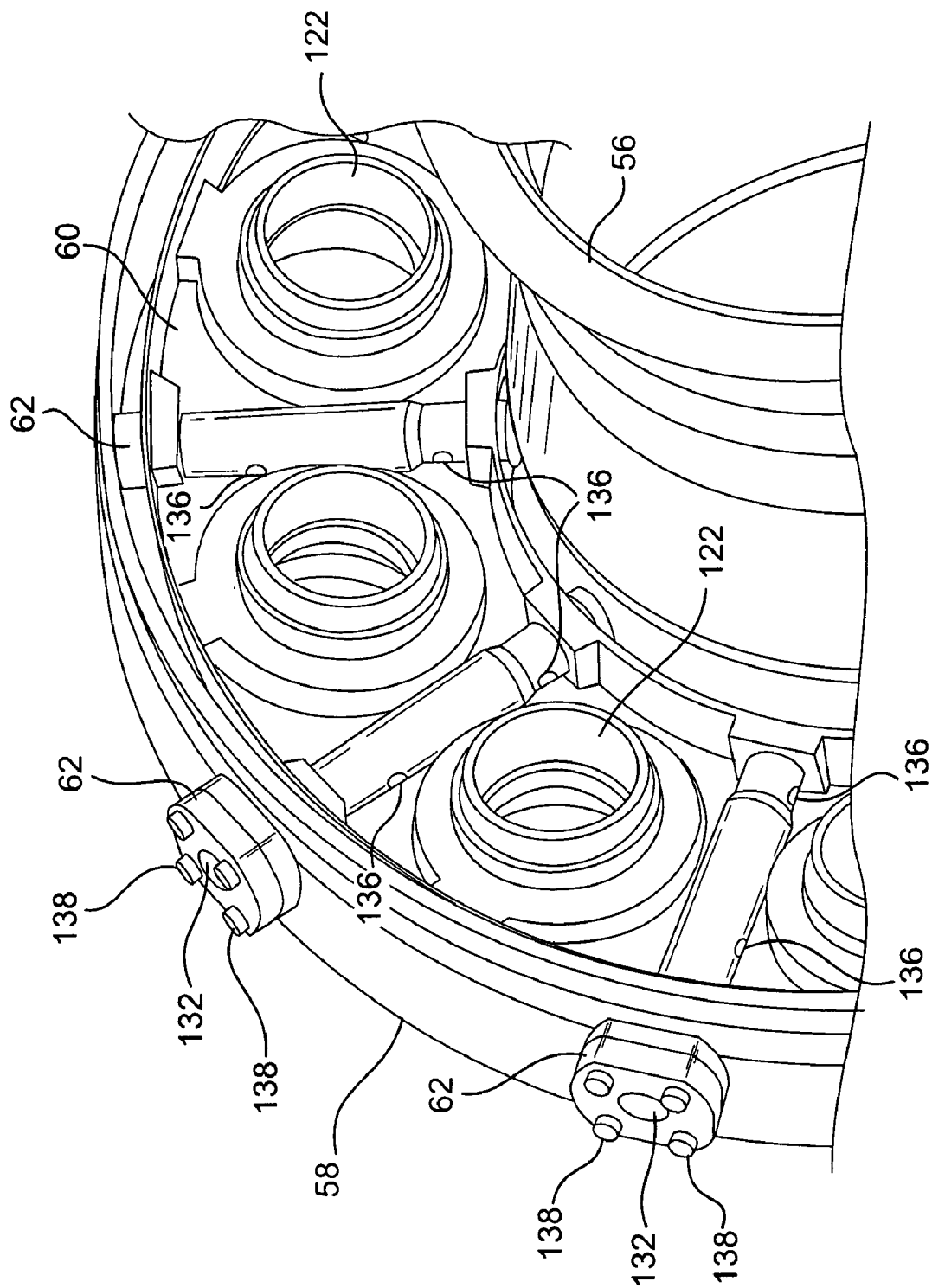
FIG. 8 is a partial, schematic perspective view of an exemplary embodiment of a combustor liner assembly with a portion removed.

FIG. 8 schematically illustrates an exemplary embodiment of a coupling between an exemplary impingement dome assembly 60, an exemplary convector assembly 58, and an exemplary liner assembly 56. As shown in FIG. 8 from the back side of impingement dome assembly 60 (with plate 124 omitted for clarity), support pins 62 extend through housings 110 of impingement dome assembly 60 and through apertures 102 of convector assembly 58. According to some embodiments, one or more (e.g., five) support pin(s) 62 may define a passage 132 extending from one end to the opposite end of support pin 62 (see FIG. 9A). According to some embodiments, one or more (e.g., five) support pins 62 may include a blind hole 134 (see FIG. 9B) configured to receive a pin (not shown), which, in turn, is configured to position combustor assembly 44 within annular chamber 40 of combustor section 14. Support pins 62 may include one or more orifice(s) 136, which provide flow communication between passage 132 of support pins 62 and annular passage 128 of impingement dome assembly 60.

Figure 9:
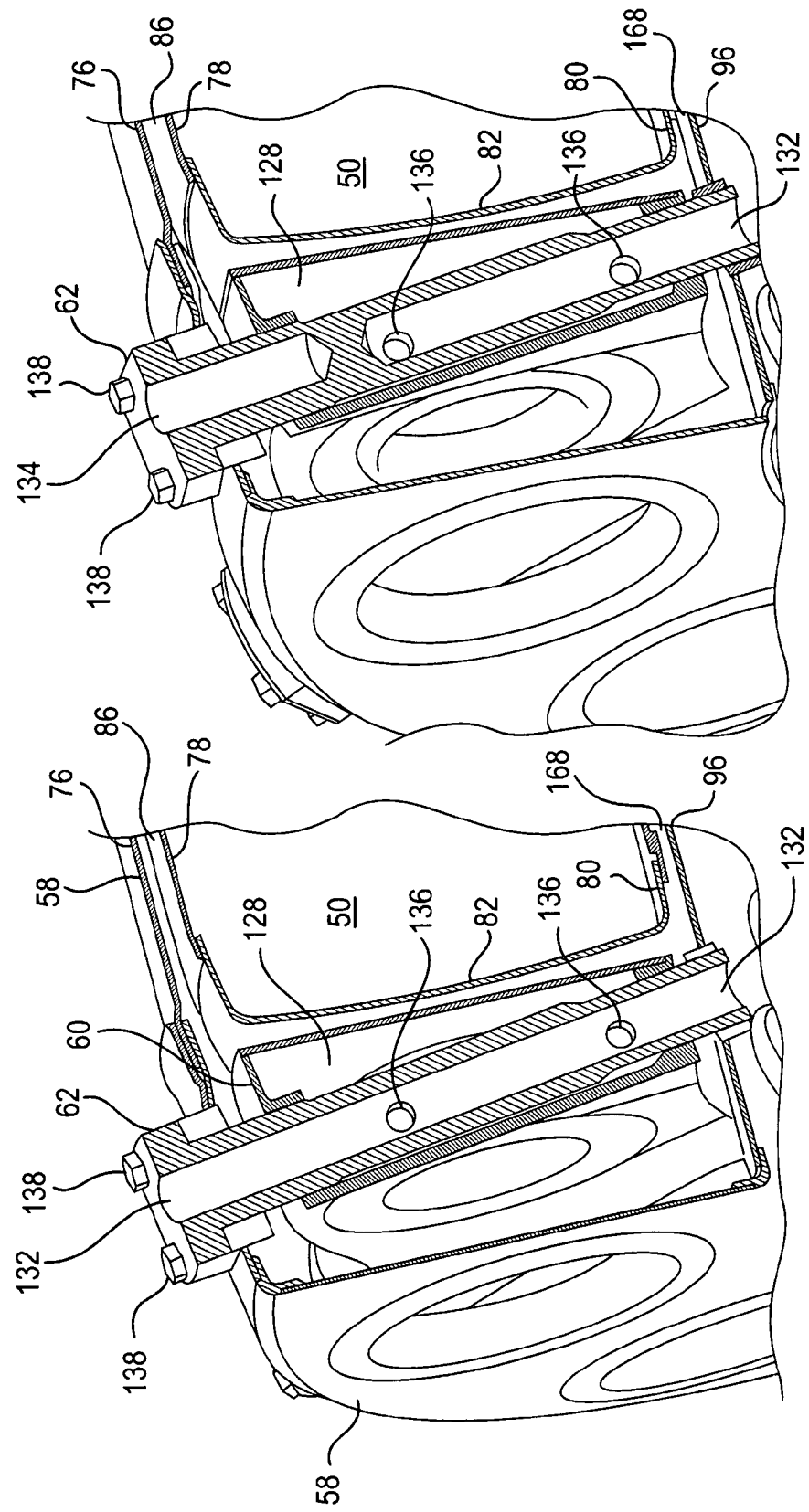
FIG. 9A is a partial, schematic perspective section view of a portion of an exemplary embodiment of a combustor liner assembly.
FIG. 9B is a partial, schematic perspective section view of another portion of the exemplary embodiment shown in FIG. 9A.

Referring to FIGS. 9A and 9B, which schematically illustrate exemplary support pins 62, exemplary support pins 62 extend from a location exterior to combustor assembly 44 to a location interior to combustor assembly 44. As shown in FIG. 9A, for example, support pin 62 defines passage 132, which provides flow communication between annular chamber 40 of combustor section 14 to orifices 136 of support pin 62. Orifices 136 of support pin 62, in turn, provide flow communication between passage 132 of support pin 62 and annular passage 128 of impingement dome assembly 60. As a result, compressed air in annular chamber 40 of combustor section 14 may flow into either end of passage 132 of support pin 62 (as shown in FIG. 9A) and into annular passage 128 of impingement dome assembly 60. Orifices 130 of plate 124 of impingement dome assembly 60 provide flow communication between annular passage 128 and hot dome 82 of liner assembly 56, such that air may splash onto the back surface of hot dome 82, thereby cooling hot dome 82.

Referring to FIG. 9B, according to some embodiments, one or more of support pins 62 may not have a passage 132 extending from one end of support pin 62 to the opposite end, as shown in FIG. 9A. Rather, some embodiments may include blind hole 134, which is configured to receive a pin (not shown) configured to position combustor assembly 44 within annular chamber 40 of combustor section 14. Such embodiments may define a passage 132 located at the end of support pin 62 opposite blind hole 134, wherein passage 132 is configured to provide flow communication between annular chamber 40 of combustor section 14 and annular passage 128 of impingement dome assembly 60. According to some embodiments, combustor assembly 44 may include one or more (e.g., five) support pin(s) 62 similar to the exemplary support pin 62 shown in FIG. 9A and one or more (e.g., five) support pin(s) similar to the exemplary embodiment support pin 62 shown in FIG. 9B, which includes blind hole 134. Support pins 62 like those shown in FIG. 9A do not assist with positioning combustor assembly 44 within annular chamber 40, but rather serve to provide flow communication between annular chamber 40 of combustor section 14 and annular passage 128 of impingement dome assembly 60 via passage 132 and orifices 136. Support pins like those shown in FIG. 9B serve to position combustor assembly 44 within annular chamber 40 and further, may also serve to provide flow communication between annular chamber 40 of combustor section 14 and annular passage 128 of impingement dome assembly 60 via passage 132 and orifices 136. According to some embodiments, combustor section 14 may include a number (e.g., five) of support pins 62 like those shown in FIG. 9A and a number (e.g., five) of support pins 62 like those shown in FIG. 9B.

Figure 10:
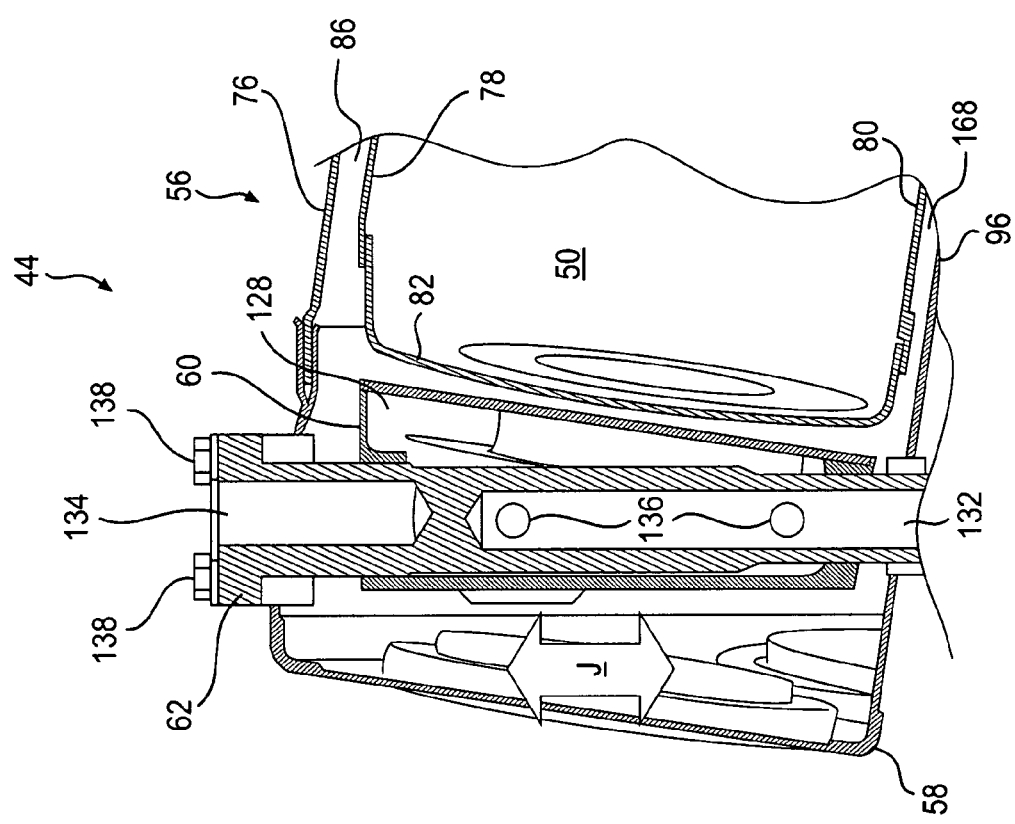
FIG. 10 is a partial, schematic section view an exemplary embodiment of a combustor liner assembly.

Referring to FIG. 10, that figure schematically illustrates an exemplary relationship between an exemplary convector assembly 58, an exemplary impingement dome assembly 60, an exemplary liner assembly 56, and an exemplary support pin 62. In the example shown, support pin 62 extends from outer flange 90 of convector assembly 58, through impingement dome assembly 60, to inner impingement shield 96 of convector assembly 58. According to some exemplary embodiments, support pin 62 may be clamped to outer flange 90 of convector assembly 58 via fasteners 138 (e.g., via four bolts, as shown in FIGS. 3 and 8).

Exemplary support pin 62 shown in FIG. 10 includes blind hole 134 configured to receive a pin (not shown) for positioning combustor assembly 44 within annular chamber 40 of combustor section 14. Support pin 62 may not be clamped to impingement dome assembly 60, such that convector assembly 58 and impingement dome assembly 60 are permitted to move in a radial direction relative to one another, as shown by arrow J. This exemplary configuration may substantially prevent damage to one or more parts of combustor assembly 44 that might caused by, for example, differing rates and/or magnitudes of thermal expansion among the parts during operation of GTE 10.

Figure 11:
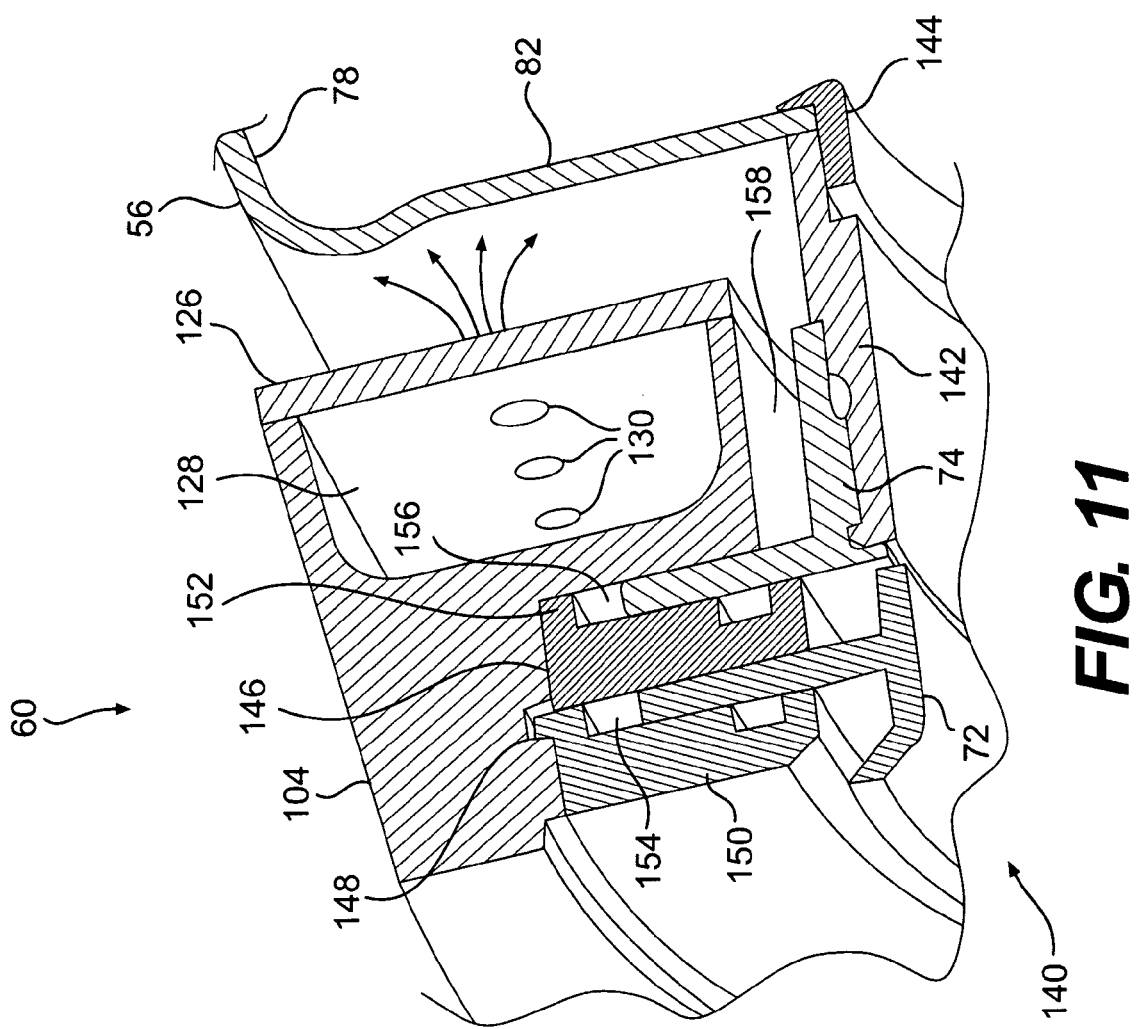
FIG. 11 is a partial, schematic section view of an exemplary embodiment of an impingement dome shown in exemplary relation to an exemplary embodiment of a hot dome.

FIG. 11 schematically illustrates an exemplary relationship among an exemplary impingement dome assembly 60 and an exemplary liner assembly 56. Exemplary impingement dome assembly 60 may be operably coupled to exemplary liner assembly 56 via, for example, an expansion assembly 140 including, for example, liner grommet 74 and a coupling member 142. For example, coupling member 142 may be coupled to hot dome 82 of liner assembly 56 via, for example, welding and/or brazing and/or joint member 144. Liner grommet 74 may be coupled to coupling 142 member via, for example, welding and/or brazing.

According to some embodiments, impingement dome assembly 60 includes annular passage 128, which may be in flow communication with one or more (e.g., ten) support pin(s) 62 (see e.g., FIGS. 9A, 9B, and 10), which, in turn, may be in flow communication with annular chamber 40 of combustor section 14, as described previously herein. Impingement dome assembly 60 may define a plurality of orifices 130 in face 126 providing flow communication between annular passage 128 and a space adjacent hot dome 82 of liner assembly 56. For example, face 126 of impingement dome assembly 60 may define a plurality of orifices 130 configured to permit cooling air supplied by annular passage 128 to splash onto hot dome 82, thereby cooling the backside of hot dome 82 during operation of GTE.

According to some embodiments, ring-shaped portion 104 of impingement dome assembly 60 may define a ledge 146 having a groove 148 for receiving a retainer 150. Retainer 150 may be configured to operably couple injector grommet 72 to impingement dome assembly 60 along with, for example, a spacer 152. According to some embodiments, retainer 150 and/or spacer 152 may be configured to at least partially define clearances 154 and/or 156. Clearances 154 and/or 156 may be configured to permit relative movement in a radial direction between fuel injector 24 and impingement dome assembly 60 and/or liner assembly 56 and impingement dome assembly 60, respectively. For example, fuel injector 24 may be received by injector grommet 72, and liner grommet 74 may operably couple liner assembly 56 to impingement dome assembly 60. Clearances 154 and/or 156 permit injector grommet 72 and liner grommet 74 to move relative to impingement dome assembly 60 in, for example, a radial direction. This exemplary configuration may substantially prevent damage to one or more parts of combustor assembly 44 that might caused by, for example, differing rates and/or magnitudes of thermal expansion among the parts during operation of GTE 10.

According to some embodiments, impingement dome assembly 60 may be configured to substantially prevent relative movement between impingement dome assembly 60 and liner grommet 74 in the circumferential direction. For example, tubular portions 94 on the back side of impingement dome assembly 60 (see FIG. 6B) may be configured to permit relative movement between liner grommet 74 and impingement dome assembly 60 in the radial direction (i.e., in a direction along a line extending through the center of the diameter of combustor assembly 44) and prevent relative movement in the circumferential direction (i.e., in a direction along a line tangential to a circle defined by the center of the combustor assembly 44).

Referring to FIG. 11, which shows a section view of a portion of an exemplary embodiment of impingement dome assembly 60, guide surfaces 122 (see FIG. 12A) defined by tubular portion 120 are configured such that a clearance 158 is formed between coupling member 142 of liner assembly 56 and liner grommet 74 and guide surface 122 defined by the inner diameter of tubular portion 120 (i.e., when shown in cross-section taken along a line extending through the center of the diameter of combustor assembly 44 (i.e., as shown in FIG. 11). Clearance 158 permits liner assembly 56 to move relative to guide surface 122 of impingement dome assembly 60 in the radial direction to account for, for example, thermal expansion (see also FIG. 13, which shows exemplary relative movement between liner assembly 56 and impingement dome assembly 60 in the radial direction along arrow K).

Figure 12A:
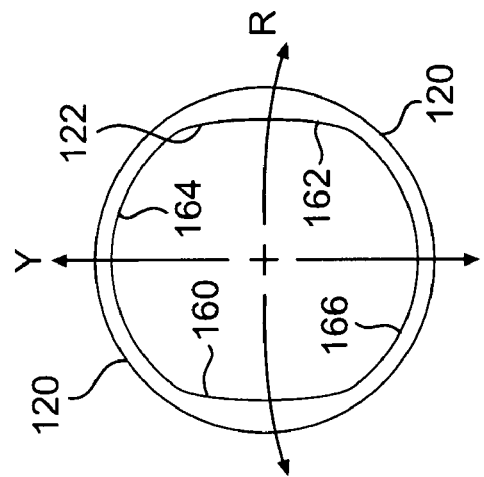
FIG. 12A is a schematic detail view of a portion of the exemplary impingement dome shown in FIG. 12A.
Figure 12:
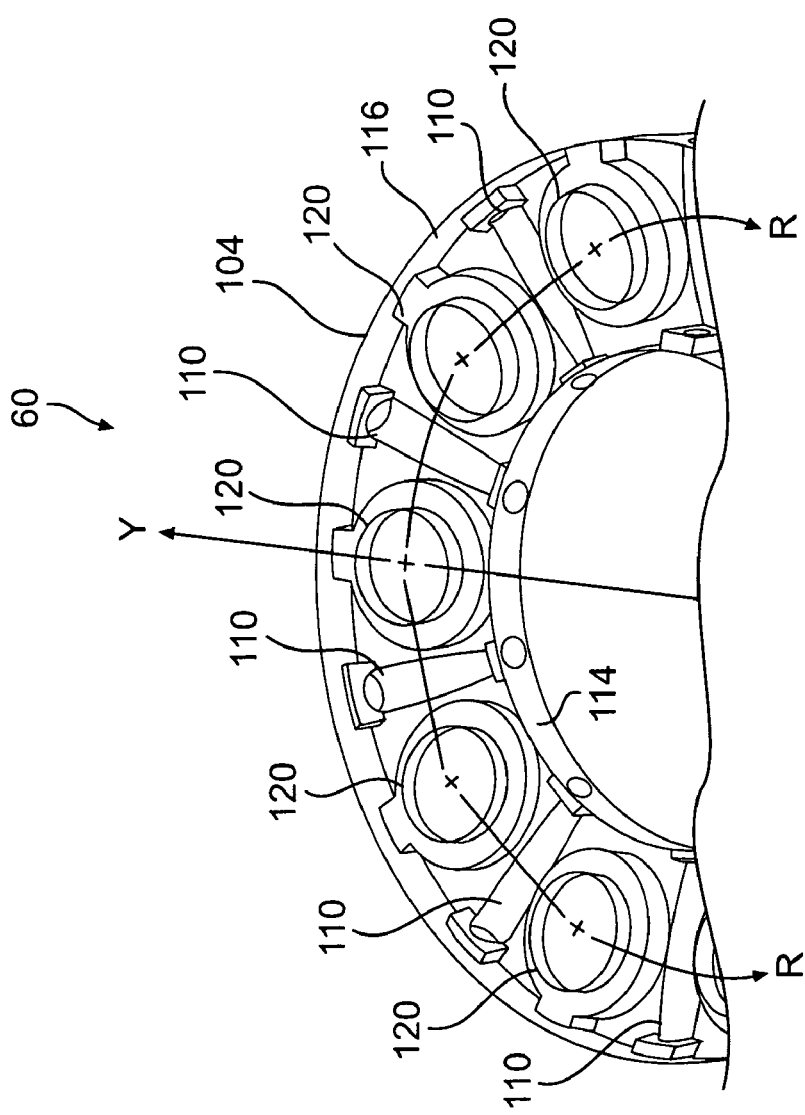
FIG. 12 is a partial, schematic perspective view of an exemplary embodiment of an impingement dome with a portion removed.
Figure 13:
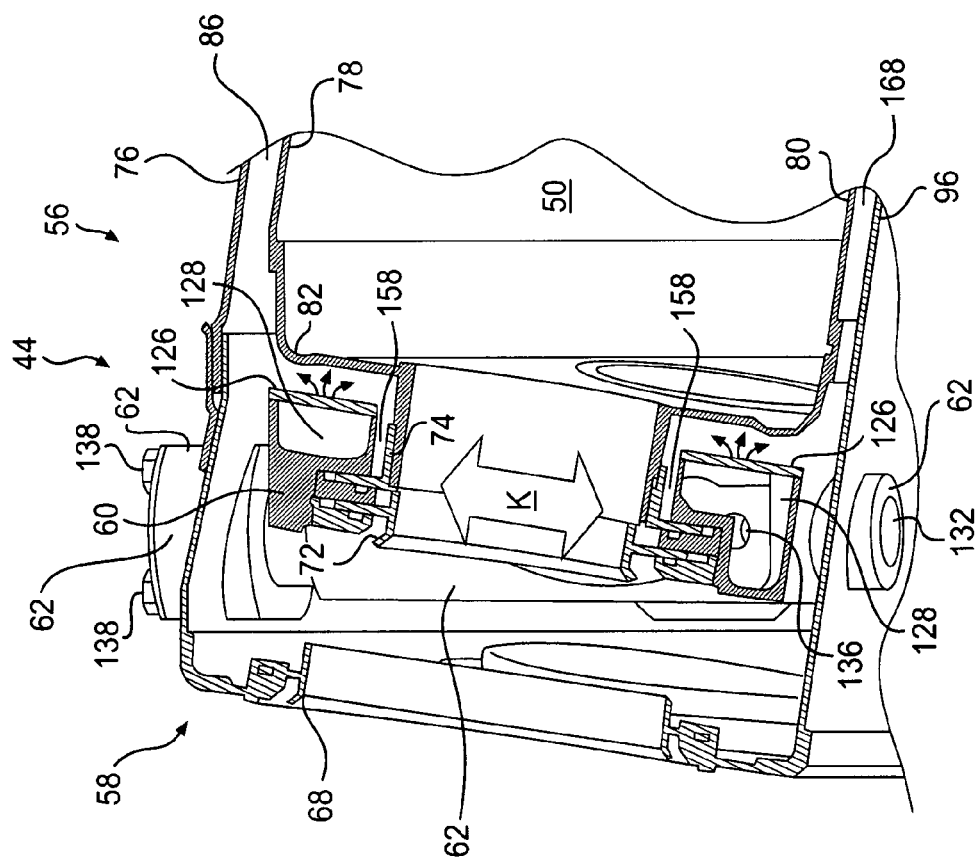
FIG. 13 is a partial, schematic section view of an exemplary embodiment of a combustor liner assembly.

Referring to FIGS. 12 and 12A, the inner diameter of tubular portions 120 defining guide surfaces 122 may not be defined by a surface having a circular cross-section. For example, as shown in FIG. 12A, although the exterior diameter of tubular portion 120 defines a circular cross-section, the inner diameter defines an oval-shaped or racetrack-shaped cross-section, where one pair of opposing sides 160 and 162 are straighter than another pair of opposing sides 164 and 166. For example, as shown in FIG. 12A, opposing sides 160 and 162 extending perpendicular to a circumferential arc R are straighter than opposing sides 164 and 166 extending perpendicular to a radially extending line Y. The distance between opposing sides 160 and 162 may be shorter than the distance between opposing sides 164 and 166. Since the distance between opposing sides 160 and 162 is shorter, less (or no) clearance is provided between coupling member 142 and/or liner grommet 74 and guide surface 122 of impingement dome assembly 60. This exemplary guide surface configuration may result in preventing (or reducing) relative movement between coupling member 142 and liner grommet 74 and impingement dome assembly 60 in the circumferential direction while still permitting relative movement in the radial direction.

INDUSTRIAL APPLICABILITY

Exemplary GTE 10 may be used, for example, to supply energy to power machines, such as airplanes, locomotives, boats, ships, trucks, automobiles, electric generators, pumps, and/or other machines configured to perform work. For example, operation of GTE 10 may result in rotational power at turbine hub 30, which may be operably coupled to a load L for performing work (see FIG. 1). For example, turbine hub 30 may be coupled to drive shaft 34 and/or a reduction transmission (not shown), which, in turn, may be coupled to load L, which may be used, for example, to supply energy to power machines.

Exemplary GTE 10 may result in increased efficiency and reduced emissions as well as increased service life and/or reduced maintenance. For example, compressed air from compressor section 12 may enter combustor section 14 inlet passage 42 (see, e.g., FIG. 14), thereby providing compressed air to annular chamber 40. According to some embodiments, all of the compressed air entering annular chamber 40 (except for compressed air used for cooling turbine section 16) may exit only via combustor section 14 by passing through combustor assembly 44 (i.e., all of the compressed air enters combustor assembly 44 and exits combustor assembly 44 via exit cone 52 at G). The use of all of the compressed air by combustor assembly 44 may result in more efficient operation of GTE 10.

Figure 14:
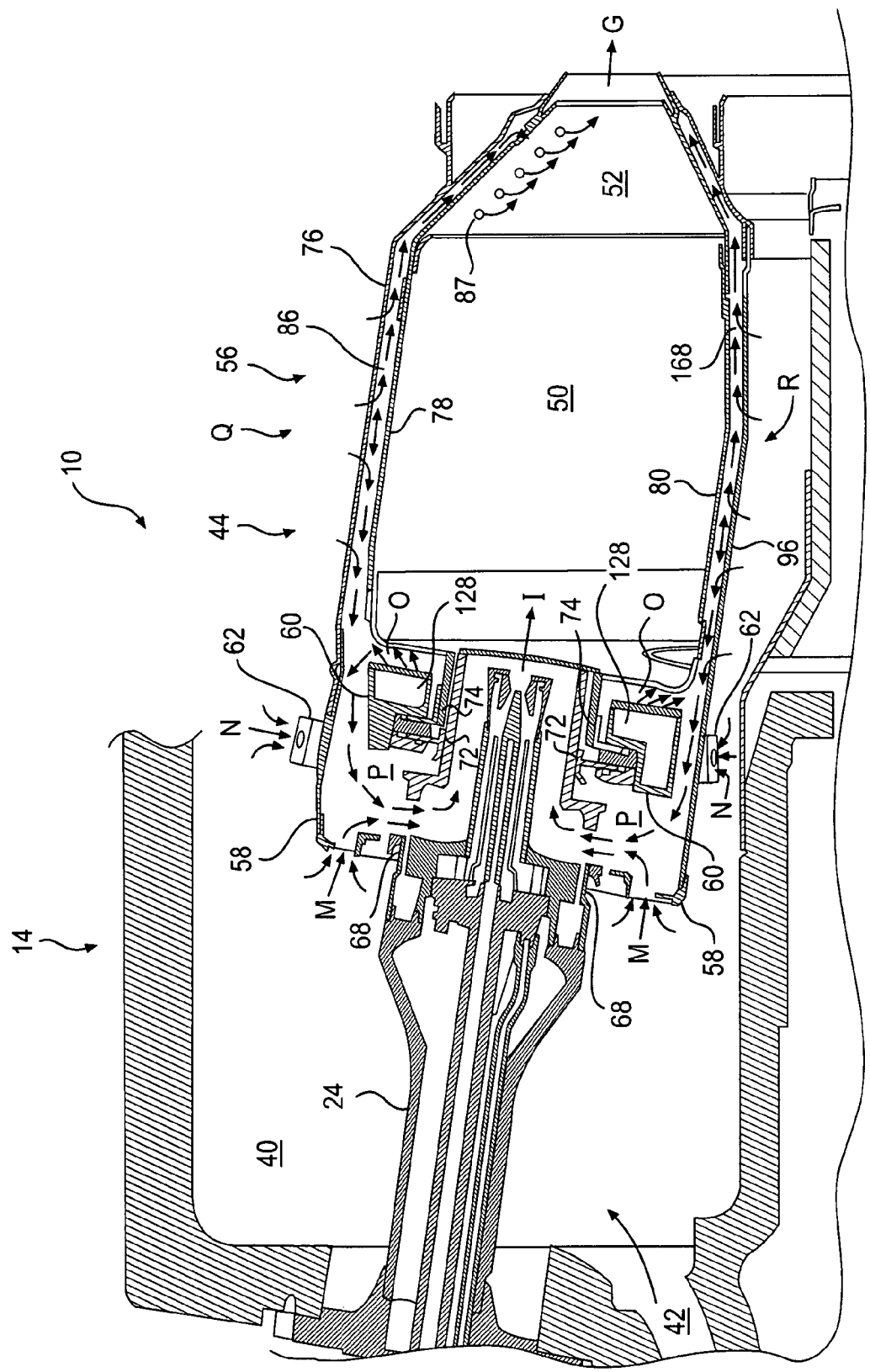
FIG. 14 is a schematic section view of a portion of an exemplary embodiment of a combustor assembly.

According to exemplary GTE 10 shown in FIG. 14, a portion of the compressed air entering annular chamber 40 is used primarily (e.g., solely) for combustion. For example, a portion of the compressed air enters combustor assembly 44 at M and flows adjacent fuel injector 24 for use in the combustion reaction. According to some embodiments, this portion of the compressed air is not used to cool liner assembly 56 prior to use for combustion.

In the exemplary GTE shown in FIG. 14, another portion of the compressed air entering annular chamber 40 is used both for cooling at least a portion of liner assembly 56 and for combustion. For example, a portion of the compressed air enters passages 132 of support pins 62 at N. For example, compressed air enters support pins 62 similar to exemplary support pins 62 shown in FIG. 9A from both ends of passage 132, flows within passage 132 and out orifice(s) 136, and into annular passage 128. From annular passage 128, compressed air flows through orifices 130 (see, e.g., FIG. 11) and into a space adjacent hot dome 82, where it may splash against the back side of hot dome 82 at O, thereby cooling hot dome 82. After this portion of the compressed air has exited orifices 130, it may flow (to the left as shown in FIG. 14) back into fuel injector 24 at P. In this exemplary fashion, this portion of the compressed air is used to cool the back side of the hot dome 82 and then is used in the combustion reaction. Exemplary support pins 62 shown in FIG. 9B provide flow for compressed air in a similar manner, except that a portion of the compressed air flows into passage 132 via the open end of passage 132, rather than via both ends of support pin 62 as shown in FIG. 9A. As a result of this exemplary configuration, this portion of the compressed air may be used efficiently to perform both a cooling function and a combustion function.

According to the exemplary embodiment show in FIG. 14, another portion of the compressed air in annular chamber 40 may enter space 86 between outer impingement shield 76 at Q and outer hot wall 78 of liner assembly 56 (see, e.g., FIG. 4) via a plurality of orifices (not shown). For example, this portion of the compressed air may splash against outer hot wall 78, thereby cooling outer wall 78. Once the compressed air has entered space 86 it may flow either (to the left as shown in FIG. 14) toward fuel injector 24 or (to the right as shown in FIG. 14) toward exit cone 52. The portion that flows toward fuel injector 24 may join the portion of the air exiting impingement dome assembly 60 and be used for the combustion reaction, and the portion that flows toward exit cone 52 may join the combustion products via orifices 87 (see also FIG. 4) in exit cone 52. Another portion of the compressed air may also enter a space 168 between inner impingement shield 96 at R and inner hot wall 80 of liner assembly 56 via a plurality of orifices (not shown). Once the compressed air has entered space 168 it may flow either (to the left as shown in FIG. 14) toward fuel injector 24 or (to the right as shown in FIG. 14) toward exit cone 52. The portion that flows toward fuel injector 24 may join the portion of the air exiting impingement dome assembly 60 and be used for the combustion reaction, and the portion that flows toward exit cone 52 may join the combustion products via orifices 87 (see also FIG. 4) in exit cone 52.

By virtue of the compressed flowing between outer impingement shield 76 and outer hot wall 78 and/or between inner impingement shield 96 and inner hot wall 80, several benefits may be achieved. First, by splashing compressed air on outer hot wall 78 and/or inner hot wall 80, outer hot wall 78 and/or inner hot wall 80 may receive sufficient cooling, respectively. Moreover, the portion of the compressed air that flows toward fuel injector 24 may be used for combustion, thereby improving the completion of the combustion reaction. In addition, some conventional GTEs may be configured to permit compressed air to pass through orifices of a liner wall into the reaction zone. While such a configuration may provide sufficient cooling, it may also serve to quench the combustion reaction, leading to undesirably high emission of air pollution-regulated exhaust gases, such as, for example, CO as well as other undesirable compounds. According to the exemplary configuration of GTE 10 shown in FIG. 14, such quenching may be substantially prevented by virtue of, for example, the compressed air flowing to fuel injector 24 and/or exit cone 52 instead of into reaction zone 50.

Since the combustion reaction generally occurs within reaction zone 50, the temperature of portions of combustor assembly 44 located closer to the combustion reaction may tend to be higher than the temperature of portions of combustor assembly 44 located further from reaction zone 50, thereby inducing temperature gradients between such portions. Such temperature gradients may result in different parts of the combustor assembly changing dimension at a different rate and/or magnitude than other parts of the combustor assembly. If not accommodated for, this may tend to reduce the service life of parts of the combustor assembly, requiring premature replacement.

The exemplary embodiment of GTE 10 shown in FIG. 14 may serve to accommodate temperature gradients between parts during operation of GTE 10. For example, liner assembly 56 may be permitted to move relative to impingement dome assembly 60 in a radial direction. As outlined in more detail previously herein, retainer 150 and/or spacer 152 (see, e.g., FIG. 11) may be configured to at least partially define clearance 156. Clearance 156 may be configured to permit relative movement in a radial direction between liner assembly 56 and impingement dome assembly 60 (see, e.g., FIG. 10). This exemplary configuration may substantially prevent damage to one or more parts of combustor assembly 44 that might be caused by differing rates and/or magnitudes of thermal expansion among the parts during operation of GTE 10. According to some embodiments, guide surfaces 122 (see, e.g., FIGS. 12 and 12A) of impingement dome assembly 60 may be configured to substantially prevent relative motion between liner assembly 56 and impingement dome assembly 60 in a circumferential direction, as outlined previously herein.

The exemplary embodiment of GTE 10 shown in FIG. 14 may serve to accommodate relative movement of fuel injector (s) 24 with respect to liner assembly 56. For example, retainer 150 and/or spacer 152 (see, e.g., FIG. 11) may be configured to at least partially define clearance 154, which may be configured to permit relative movement in a radial direction between fuel injector 24 and impingement dome assembly 60 and/or liner assembly 56. Fuel injector 24 may be received by injector grommet 72, and clearance 154 and injector grommet 72 may be configured to permit fuel injector 24 to move relative to impingement dome assembly 60 in a radial direction. This exemplary configuration may substantially prevent damage to one or more parts of combustor assembly 44 during operation of GTE 10. According to some embodiments, guide surfaces 122 (see, e.g., FIGS. 12 and 12A of impingement dome assembly 60 may be configured to substantially prevent relative motion between fuel injector 24 and impingement dome assembly 60 in a circumferential direction, as outlined previously herein.

According to some embodiments, combustor assembly 44 may configured to permit relative movement between fuel injector(s) 24 and convector assembly 58. For example, convector assembly grommet 74 and convector assembly 58 may be configured to permit relative movement between convector assembly grommet 74 and convector assembly 44 (e.g., in a radial direction and/or a circumferential direction). Fuel injector 24 may be received in convector assembly grommet 74, thereby permitting the relative movement. This exemplary configuration may serve to prevent damage to combustor assembly 44.

It will be apparent to those skilled in the art that various modifications and variations can be made to the exemplary disclosed GTEs. Other embodiments will be apparent to those skilled in the art from consideration of the specification and practice of the exemplary disclosed GTEs. It is intended that the specification and examples be considered as exemplary only, with a true scope being indicated by the following claims and their equivalents.

What is claimed is:

1. A method of operating a combustor assembly of a gas turbine engine, the method comprising:
   flowing compressed air received from a compressor into a combustor housing;
   flowing a first portion of the compressed air into an annular passage of an impingement dome assembly;
   flowing the first portion of the compressed air from the annular passage of the impingement dome assembly onto a dome;
   flowing the first portion of the compressed air from the dome to a plurality of fuel injectors configured to inject fuel for combustion;
   flowing a second portion of the compressed air from the combustor housing to the fuel injectors for combustion; and
   flowing a third portion of the compressed air from the combustor housing to a liner assembly of the combustor, wherein at least a portion of the third portion flows through a passageway in the liner assembly and through an orifice in the liner assembly into an exit cone.

2. The method of claim 1, further including cooling the dome with the first portion of the compressed air and thereafter using the first portion of the compressed air for combustion.

3. The method of claim 1, further including cooling the liner assembly via the third portion of the compressed air.

4. The method of claim 1, wherein a remainder of the third portion flows to the plurality of fuel injectors.

5. The method of claim 1, wherein the portion of the third portion combines with combustion products at the exit cone.

6. The method of claim 1, wherein flowing the first portion of the compressed air into the impingement dome assembly includes flowing the first portion of the compressed air through a passage of a support pin.

7. The method of claim 6, wherein the passage of the support pin is configured to supply air to the annular passage of the impingement dome assembly.

8. A method of operating a combustor assembly of a gas turbine engine, the method comprising:
   flowing compressed air received from a compressor into a combustor housing;

flowing a first portion of the compressed air into an impingement dome assembly including flowing the first portion of the compressed air through a passage of a support pin;

flowing the first portion of the compressed air from the impingement dome assembly onto a dome;

flowing the first portion of the compressed air from the dome to at least one fuel injector configured to inject fuel for combustion;

flowing a second portion of the compressed air from the combustor housing to the at least one fuel injector; and flowing a third portion of the compressed air from the combustor housing to a liner assembly of the combustor.

9. The method of claim 8, wherein at least a portion of the third portion flows through a passageway in the liner assembly and through an orifice in the liner assembly into an exit cone.

10. The method of claim 9, wherein a remainder of the third portion flows to the at least one fuel injector.

11. The method of claim 9, wherein the portion of the third portion combines with combustion products at the exit cone.

12. The method of claim 8, further including cooling the dome with the first portion of the compressed air and thereafter using the first portion of the compressed air for combustion.

13. The method of claim 8, further including cooling the liner assembly with the third portion of the compressed air.

14. The method of claim 8, wherein the passage of the support pin is configured to supply air to an annular passage of the impingement dome assembly.

15. A method of operating a turbine, the method comprising:

flowing air received from a compressor into a combustor housing;

flowing a first portion of the air into an annular passage of an impingement dome assembly;

flowing the first portion of the air from the impingement dome assembly onto a dome;

flowing the first portion of the air from the dome to at least one fuel injector configured to inject fuel for combustion;

flowing a second portion of the air from the combustor housing to the at least one fuel injector;

flowing a third portion of the air from the combustor housing to a liner assembly of the combustor; and after flowing the first portion of the air into the annular passage of the impingement dome assembly and flowing the third portion of the air from the combustor housing to the liner assembly, combining at least a portion of the first portion of air and at least a portion of the third portion of air with the second portion of air upstream of the at least one fuel injector.

16. The method of claim 15, wherein the combined flow of the at least a portion of the first portion of air, the at least a portion of the third portion of air, and the second portion of air flow to the at least one fuel injector for combustion.

17. The method of claim 15, further including cooling the dome with the first portion of the compressed air.

18. The method of claim 15, further including cooling the liner assembly with the third portion of the compressed air.

19. The method of claim 15, wherein at least some of the third portion flows through a passageway in the liner assembly and through an orifice in the liner assembly into an exit cone.

* * * * *